(12) United States Patent
Li et al.

(10) Patent No.: US 12,449,851 B2
(45) Date of Patent: Oct. 21, 2025

(54) MIDDLE FRAME OF ELECTRONIC DEVICE, MIDDLE FRAME ASSEMBLY, AND ELECTRONIC DEVICE

(71) Applicant: HONOR DEVICE CO., LTD., Shenzhen (CN)

(72) Inventors: Qi Li, Shenzhen (CN); Tao Yang, Shenzhen (CN); Wanmin Chang, Shenzhen (CN); Guoliang Huo, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/030,951

(22) PCT Filed: Sep. 7, 2022

(86) PCT No.: PCT/CN2022/117562
§ 371 (c)(1),
(2) Date: Apr. 7, 2023

(87) PCT Pub. No.: WO2023/051207
PCT Pub. Date: Apr. 6, 2023

(65) Prior Publication Data
US 2023/0384829 A1    Nov. 30, 2023

(30) Foreign Application Priority Data

Sep. 28, 2021   (CN) .......................... 202122368863.2

(51) Int. Cl.
*G06F 1/16*     (2006.01)
*B22D 17/20*    (2006.01)
(Continued)

(52) U.S. Cl.
CPC ........... *G06F 1/1635* (2013.01); *B22D 17/20* (2013.01); *B22D 17/22* (2013.01); *G06F 1/1656* (2013.01); *H04M 1/0202* (2013.01); *Y02E 60/10* (2013.01)

(58) Field of Classification Search
CPC .. G06F 1/1635; G06F 1/1656; H04M 1/0202; H04M 1/0262; H04M 1/026;
(Continued)

(56) References Cited

U.S. PATENT DOCUMENTS 6,275,683 B1 *   8/2001   Smith ................. H04B 1/3833
                                                    455/575.1
6,820,678 B2 *  11/2004   Ishiduka ............... B22D 19/16
                                                    164/112
(Continued)

FOREIGN PATENT DOCUMENTS

CN       101456068 A      6/2009
CN       203764938 U      8/2014
(Continued)

*Primary Examiner* — Allen L Parker
*Assistant Examiner* — Martin Antonio Asmat Uceda
(74) *Attorney, Agent, or Firm* — WOMBLE BOND DICKINSON (US) LLP (57) ABSTRACT

Embodiments of this application disclose a middle frame of an electronic device, a middle frame assembly, and an electronic device. The middle frame assembly includes a middle frame and a plastic part injection-molded on a surface of the middle frame. The middle frame includes a middle plate and a first accommodation chamber configured to accommodate a battery of the electronic device. There is a drainage material section on an outer side surface of the middle frame. The middle plate includes a first middle plate region for forming a bottom wall of the first accommodation chamber. The drainage material section is at least partially (Continued)

located between surfaces on which a top surface and a bottom surface of the first middle plate region are located.

20 Claims, 5 Drawing Sheets

(51) Int. Cl.
*B22D 17/22* (2006.01)
*H04M 1/02* (2006.01)

(58) Field of Classification Search
CPC ... Y02E 60/10; H01M 50/242; H05K 5/0217; B22D 17/20; B22D 17/22
See application file for complete search history.

(56) References Cited

U.S. PATENT DOCUMENTS

| | | | | |
|---|---|---|---|---|
| 7,173,826 B1 * | 2/2007 | Chiou | ............... | H05K 5/0269 |
| | | | | 361/801 |
| 7,654,305 B2 | 2/2010 | Hirao | | |
| 8,861,198 B1 * | 10/2014 | Asuncion | ............... | G06F 1/1658 |
| | | | | 361/679.55 |
| 8,975,540 B2 * | 3/2015 | Mareno | ............... | H04M 1/0249 |
| | | | | 174/559 |
| 9,116,374 B2 * | 8/2015 | Nishimoto | ........ | G02F 1/133308 |
| 9,232,680 B2 * | 1/2016 | Yi | ............... | H05K 1/0281 |
| 9,370,823 B2 * | 6/2016 | Wang | ............... | B22D 19/00 |
| 9,625,949 B2 * | 4/2017 | Lee | ............... | G06F 1/1658 |
| 10,124,405 B2 * | 11/2018 | Wang | ............... | B22D 19/16 |
| 10,135,959 B2 * | 11/2018 | Tang | ............... | H04M 1/02 |
| 10,143,110 B2 * | 11/2018 | Cai | ............... | H05K 7/20445 |
| 10,602,632 B2 * | 3/2020 | Wei | ............... | H05K 5/0247 |
| 10,631,420 B1 * | 4/2020 | Xiong | ............... | H05K 7/18 |
| 10,674,623 B2 | 6/2020 | Jeong et al. | | |
| 10,827,632 B2 * | 11/2020 | Huang | ............... | B23P 11/02 |
| 10,845,912 B2 * | 11/2020 | Park | ............... | G06F 1/1652 |
| 11,181,953 B2 * | 11/2021 | Haruki | ............. | G02F 1/133331 |
| 11,192,169 B2 * | 12/2021 | Ren | ............... | B22D 17/20 |
| 11,609,446 B2 * | 3/2023 | Hu | ............... | G06F 1/1658 |
| 12,127,358 B2 * | 10/2024 | Huang | ............... | G06F 1/1656 |
| 2001/0034242 A1 * | 10/2001 | Takagi | ............... | H04M 1/0216 |
| | | | | 455/575.3 |
| 2013/0257712 A1 * | 10/2013 | Imamura | ............... | G06F 1/1658 |
| | | | | 345/156 |
| 2014/0072761 A1 * | 3/2014 | Kawada | ............... | B29C 45/14 |
| | | | | 264/273 |
| 2014/0284096 A1 * | 9/2014 | Wu | ............... | B29C 45/14311 |
| | | | | 29/458 |
| 2017/0078460 A1 * | 3/2017 | Lee | ............... | H04M 1/0277 |
| 2018/0343331 A1 * | 11/2018 | Jaegal | ............... | H04M 1/0266 |
| 2024/0100628 A1 * | 3/2024 | Zhang | ............... | B23K 26/244 |
| 2024/0195899 A1 * | 6/2024 | Huo | ............... | H04M 1/0283 |
| 2024/0224442 A1 * | 7/2024 | Qiao | ............... | H04M 1/0249 |
| 2024/0372576 A1 * | 11/2024 | Yang | ............... | G06F 1/1656 |

FOREIGN PATENT DOCUMENTS

| | | | | |
|---|---|---|---|---|
| CN | 104985157 A | | 10/2015 | |
| CN | 204770568 U | | 11/2015 | |
| CN | 206215887 U | | 6/2017 | |
| CN | 208743648 U | | 4/2019 | |
| CN | 109719502 A | | 5/2019 | |
| CN | 112272479 A | * | 1/2021 | ............... H01Q 1/22 |
| CN | 217192489 U | | 8/2022 | |
| EP | 3599296 A1 | | 1/2020 | |
| JP | H0890211 A | | 4/1996 | |
| JP | 2005177820 A | | 7/2005 | |

* cited by examiner

MIDDLE FRAME OF ELECTRONIC DEVICE, MIDDLE FRAME ASSEMBLY, AND ELECTRONIC DEVICE

CROSS-REFERENCE TO RELATED APPLICATIONS

This application is a national stage of International Application No. PCT/CN2022/117562, filed on Sep. 7, 2022, which claims priority to Chinese Patent Application No. 202122368863.2, filed on Sep. 28, 2021. The disclosures of both of the aforementioned applications are hereby incorporated by reference in their entireties.

TECHNICAL FIELD

This application relates to the field of electronic product technologies, and in particular, to a middle frame of an electronic device.

BACKGROUND

A middle frame is a main force-bearing component of an electronic device such as a mobile phone, and is usually formed through die casting. Overall strength and overall reliability of the electronic device are determined based on forming quality of the middle frame.

Currently, the middle frame of the electronic device that is formed through die casting is always accompanied by a large quantity of sand holes, resulting in poor quality and low strength of the middle frame. Consequently, the overall strength and reliability cannot meet ideal requirements.

SUMMARY

Embodiments of this application provide a middle frame of an electronic device. The middle frame has few sand holes, good quality, and high strength, to resolve a problem that overall strength and reliability of the electronic device are low due to poor quality and low strength of the middle frame.

According to a first aspect, the middle frame includes a middle plate and a first accommodation chamber configured to accommodate a battery, there is a drainage material section on an outer side surface of the middle frame, the middle plate includes a first middle plate region for forming a bottom wall of the first accommodation chamber, and the drainage material section is at least partially located between surfaces on which a top surface and a bottom surface of the first middle plate region are located. In this design, an outlet of a runner in a corresponding die casting mold is at least partially located between surfaces on which a top wall and a bottom wall of a first middle plate region mold cavity are located. Therefore, the outlet of the runner in the die casting mold is at least partially directly opposite to the first middle plate region mold cavity, and there is no height difference from the first middle plate region mold cavity in a thickness direction of the mold cavity. In this case, at least a part of casting liquid does not flow in the thickness direction of the mold cavity after flowing out of the outlet of the runner, but directly flows into the first middle plate region mold cavity in a direction substantially parallel to the top wall and the bottom wall of the first middle plate region mold cavity, and does not need to overcome a height difference or need to turn. Therefore, there is a small flow rate loss and a stable flow state. In this way, even if the casting liquid flows into a position far away from the runner, a relatively high flow rate and a stable flow state can be maintained, to improve filling quality, so that the formed middle frame has few sand holes, good forming quality, and high strength. In addition, in this design, even if the first middle plate region has a smaller thickness, the filling quality can be ensured. Therefore, the first middle plate region is allowed to be thinner, to facilitate a lightweight product design and provide larger accommodation space for the battery.

In an implementation of the first aspect, based on the first aspect, a top-side edge of the drainage material section is coplanar with the top surface of the first middle plate region, and a bottom-side edge of the drainage material section is coplanar with the bottom surface of the first middle plate region. In this design, a relatively large part of the outlet of the runner in the corresponding die casting mold is directly opposite to the first middle plate region mold cavity, to greatly reduce a speed loss of the casting liquid.

According to a second aspect, based on the first aspect or the implementation of the first aspect, the middle frame includes a second accommodation chamber, the middle plate includes a second middle plate region for forming a bottom wall of the second accommodation chamber, the second middle plate region is closer to the drainage material section than the first middle plate region, and there is a first machined surface on a top surface and/or a bottom surface of the second middle plate region. In this design, a thickness of a second middle plate region mold cavity in the corresponding die casting mold needs to be designed to be greater than a thickness of the second middle plate region of the target middle frame product (in other words, the second middle plate region mold cavity is thickened). Therefore, a passing ability of the casting liquid in this region can be improved, to further improve the filling quality, so that the formed middle frame has few sand holes, good forming quality, and high strength.

In a first implementation of the second aspect, based on the second aspect, a first through hole is disposed in the second middle plate region, and there is a second machined surface on a wall surface of the first through hole. In this design, the first through hole is not formed in a die casting process, but is formed through machining after die casting is completed. Therefore, no cylinder for forming a through hole is disposed in the second middle plate region mold cavity in the corresponding die casting mold, and there is no problem that there is high flow resistance for the casting liquid because the cylinder blocks flow of the casting liquid. In this way, the speed loss of the casting liquid can be further reduced, to reduce sand holes on the middle frame and improve the quality and strength of the middle frame.

According to a third aspect, based on the first aspect, the implementation of the first aspect, the second aspect, or the implementation of the second aspect, the middle frame includes a third accommodation chamber, the middle plate includes a third middle plate region for forming a bottom wall of the third accommodation chamber, a second through hole is disposed in the third middle plate region, and there is a third machined surface on a wall surface of the second through hole. In this design, the second through hole is not formed in the die casting process, but is formed through machining after die casting is completed. Therefore, no cylinder for forming a through hole is disposed in a third middle plate region mold cavity in the corresponding die casting mold, and there is no problem that there is high flow resistance for the casting liquid because the cylinder blocks flow of the casting liquid. In this way, the speed loss of the casting liquid can be further reduced, to reduce sand holes on the middle frame and improve the quality and strength of the middle frame.

According to a fourth aspect, based on the third aspect, one of the second accommodation chamber and the third accommodation chamber is configured to accommodate at least a part of an antenna of the electronic device, and the other accommodation chamber is configured to accommodate at least a part of a button of the electronic device. In this design, different electronic components or mechanical components of the electronic equipment are orderly and neatly packed in different accommodation chambers of the middle frame, so that assembly of the electronic device is more orderly performed, to facilitate automatic manufacturing of the electronic device.

According to a fifth aspect, based on the first aspect, the implementation of the first aspect, the second aspect, the implementation of the second aspect, the third aspect, the implementation of the third aspect, or the fourth aspect, the middle frame includes a frame disposed around an outer side of the middle plate and a separation rib located in enclosed space of the frame, and a sidewall of the accommodation chamber is formed by the frame and/or the separation rib. In this design, the accommodation chambers are separated.

According to a sixth aspect, based on the first aspect, the implementation of the first aspect, the second aspect, the implementation of the second aspect, the third aspect, the implementation of the third aspect, the fourth aspect, or the fifth aspect, the middle frame is made of an alloy material. In this design, it is easy to perform die casting.

An embodiment of this application further provides a middle frame assembly. The middle frame assembly includes the middle frame provided in the foregoing aspects and the implementations of the aspects and a plastic part injection-molded on a surface of the middle frame. The middle frame provided in the foregoing aspects and the implementations of the aspects has the foregoing beneficial effects, and therefore the middle frame assembly also has the foregoing beneficial effects. In addition, the plastic part can implement a cushioning function and a function of protecting the middle frame.

An embodiment of this application further provides an electronic device. The electronic device includes the middle frame provided in the foregoing aspects and the implementations of the aspects. The middle frame provided in the foregoing aspects and the implementations of the aspects has the foregoing beneficial effects, and therefore the electronic device also has the foregoing beneficial effects.

BRIEF DESCRIPTION OF DRAWINGS

To describe the technical solutions in the embodiments of the present invention or in the conventional technology more clearly, the following briefly describes the accompanying drawings required for describing the embodiments or the conventional technology. Apparently, the accompanying drawings in the following description show some embodiments of the present invention, and a person of ordinary skill in the art may still derive other drawings from these accompanying drawings without creative efforts.

DESCRIPTION OF REFERENCE NUMERALS

01: Drainage material;
10: Middle plate; 10a: First middle plate region; 10b: Second middle plate region; 10c: Third middle plate region; 101: First machined surface; 102: Second machined surface; 103: First through hole; 104: Second through hole; 105: Third machined surface;
20: Frame; 201: First frame edge; 202: Second frame edge; 203: Third frame edge; 204: Fourth frame edge; 205: Arc-shaped transition part;
30: First separation rib; 40: Second separation rib; 50: Third separation rib; 60: Fourth separation rib; 70: First accommodation chamber; 80: Second accommodation chamber; and 90: Third accommodation chamber.

DESCRIPTION OF EMBODIMENTS

Figure 1:
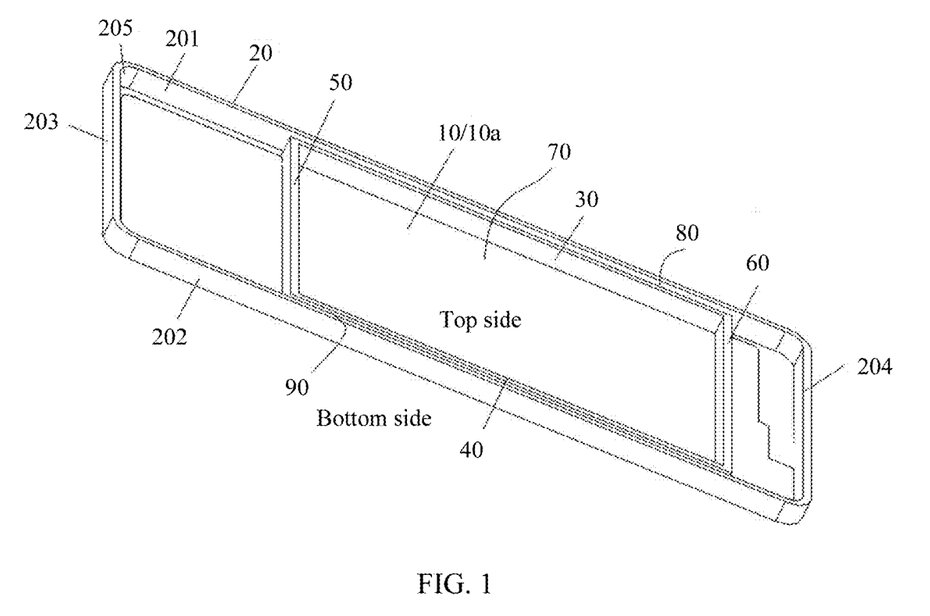
FIG. 1 and FIG. 2 are stereograms of an embodiment of a middle frame of an electronic device from different perspectives according to this application.

As shown in FIG. 1, a middle frame of an electronic device provided in this application includes a middle plate 10 and a first accommodation chamber 70 configured to accommodate a battery of the electronic device. The middle plate 10 is of a thin-walled structure, and the middle plate 10 includes a first middle plate region 10a. The first middle plate region 10a forms a bottom wall of the first accommodation chamber 70.

Figure 2:
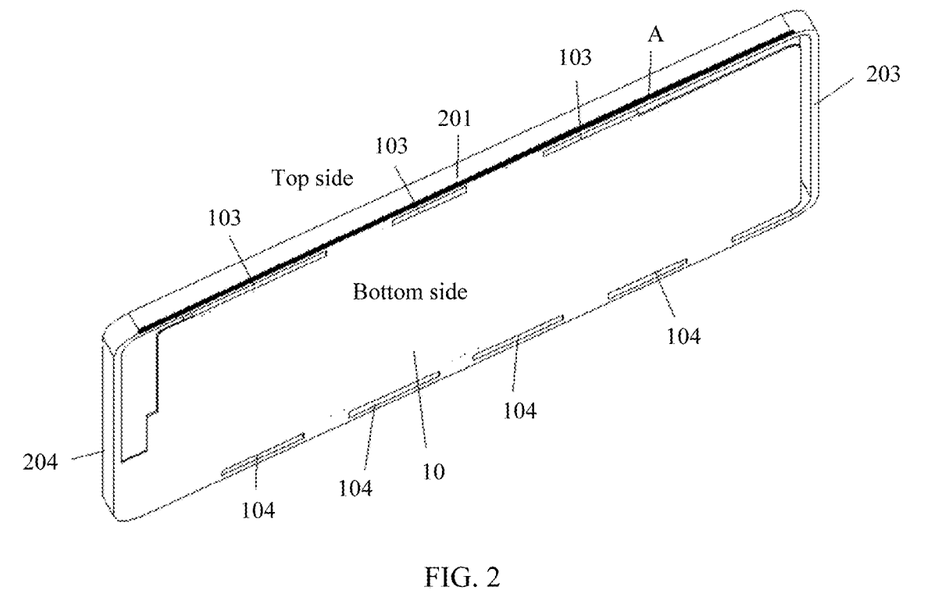

As shown in FIG. 2, there is a drainage material section A on an outer side surface of the middle frame. The outer side surface of the middle frame is a surface connected between an outer edge of a top surface and an outer edge of a bottom surface of the middle frame. An outer side surface of a part described in this specification is a surface connected between an outer edge of a top surface and an outer edge of a bottom surface of the part.

Drainage material: The middle frame is formed through die casting by using a die casting mold, and a middle frame mold cavity is disposed in the corresponding die casting mold. The middle frame mold cavity is a mold cavity for forming the middle frame. A mold cavity of a part described in this specification is a mold cavity for forming the part. A runner is further disposed in the die casting mold. An inlet of the runner communicates with a sprue, and an outlet of the runner communicates with the middle frame mold cavity, to implement a flow guiding function. After die casting is completed, a part of casting liquid is formed in the runner, and a formed material in the runner is the drainage material, which is also referred to as a casting system condensate or recyclable material.

Figure 6:
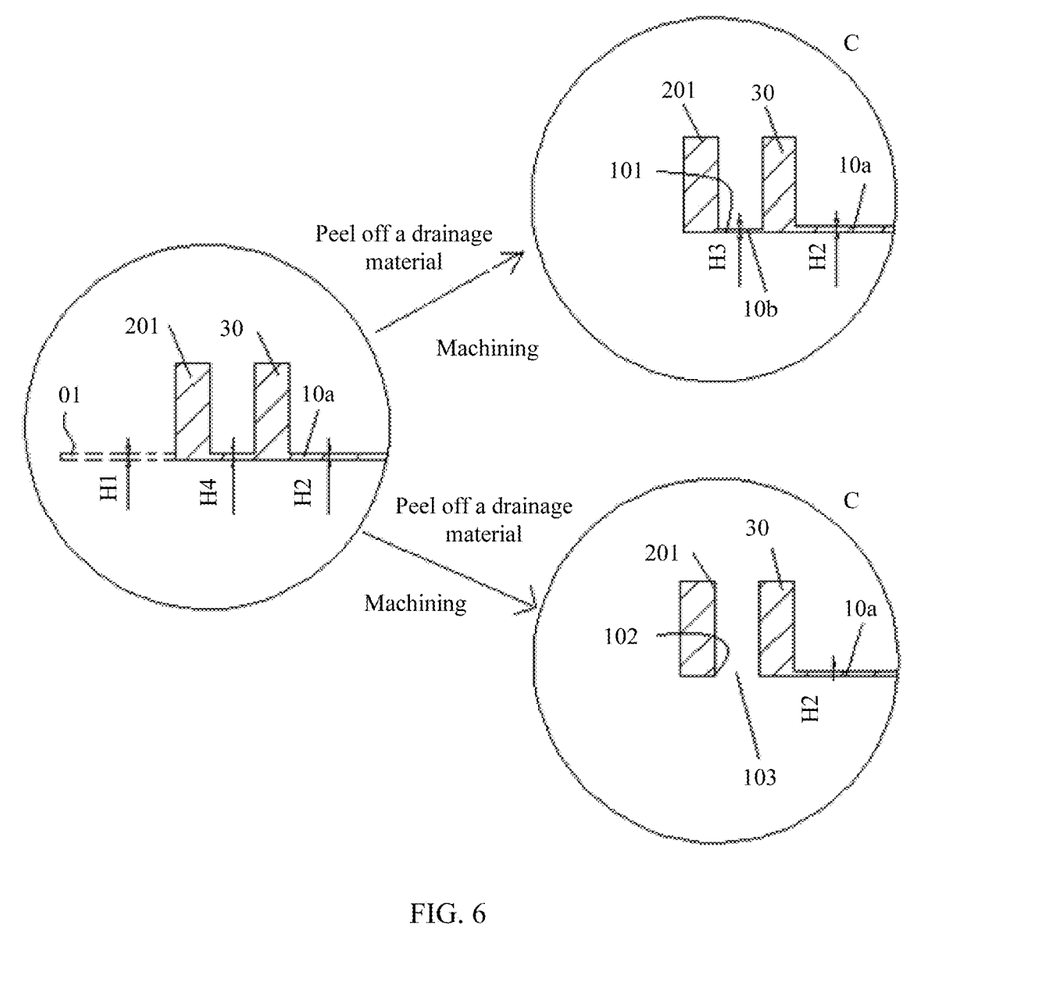
FIG. 6 shows a machining process of peeling off a drainage material and a second middle plate region, where parts presented in the figure correspond to parts in a circle C in FIG. 4 and FIG. 5, a left figure shows a middle frame preform formed through die casting, and a right figure shows a middle frame product.

Drainage material section: As shown in FIG. 6, the drainage material 01 existing after demolding is connected to the middle frame, and therefore the drainage material 01 existing after demolding needs to be peeled off from the middle frame to obtain a middle frame product. After the drainage material 01 is peeled off, a section is inevitably formed on a surface of the middle frame. The section is the drainage material section A. A color, roughness, flatness, and/or the like of the drainage material section A are/is different from those/that of a region on the surface of the middle frame, and may be observed and identified visually or by using a dedicated detection device.

Figure 4:
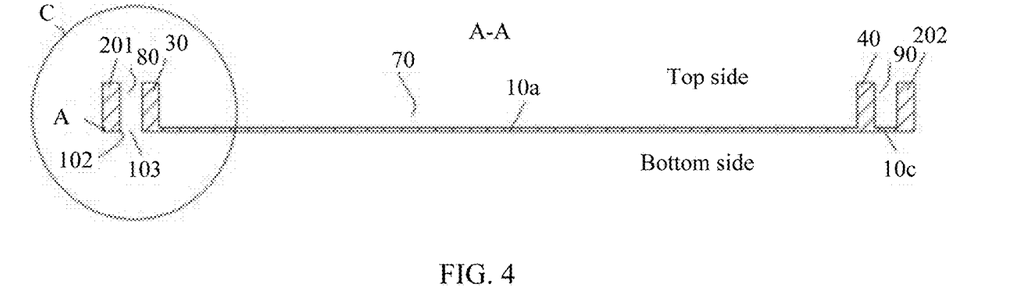
FIG. 4 is a sectional view of FIG. 3 along A-A.

As shown in FIG. 4, the drainage material section A is at least partially located between surfaces on which a top surface and a bottom surface of the first middle plate region 10a are located. The surface on which the top surface is located is the top surface and an extension surface of the top surface, and the surface on which the bottom surface is located is the bottom surface and an extension surface of the bottom surface.

The drainage material section A is at least partially located between the surfaces on which the top surface and the bottom surface of the first middle plate region 10a are located, and therefore the outlet of the runner in the corresponding die casting mold is at least partially located between surfaces on which a top wall and a bottom wall of a first middle plate region mold cavity are located. Therefore, the outlet of the runner in the die casting mold is at least partially directly opposite to the first middle plate region mold cavity, and there is no height difference from the first middle plate region mold cavity in a thickness direction of the mold cavity. In this case, at least a part of the casting liquid does not flow in the thickness direction of the mold cavity after flowing out of the outlet of the runner, but directly flows into the first middle plate region mold cavity in a direction substantially parallel to the top wall and the bottom wall of the first middle plate region mold cavity. On the contrary, if there is a height difference, the casting liquid first flows in the thickness direction of the mold cavity after flowing out of the outlet of the runner, to overcome the height difference, and then turns to flow into the first middle plate region mold cavity in a direction parallel to the top wall and the bottom wall of the first middle plate region mold cavity. In this process, there is a relatively large flow rate loss, and a flow state is disturbed. Consequently, there is a relatively low flow rate and an unstable flow state when the casting liquid flows into the first middle plate region mold cavity.

In addition, to meet a requirement of accommodating the battery, the first middle plate region 10a usually has a relatively large area and a relatively small thickness. Therefore, the first middle plate region mold cavity in the corresponding die casting mold also features a large area and a small thickness. In this case, if the casting liquid enters the first middle plate region mold cavity in an unstable flow state, the casting liquid is prone to hit the top wall and the bottom wall of the first middle plate region mold cavity, and there is an increase in the flow rate loss and the flow state is further disturbed. Consequently, when the casting liquid reaches a position far away from the runner, there is a very low flow rate and serious turbulence, and consequently filling quality is affected, and the formed middle frame has a large quantity of sand holes, poor quality, and low strength.

In the solutions, at least a part of the casting liquid does not flow in the thickness direction of the mold cavity after flowing out of the outlet of the runner, but directly flows into the first middle plate region mold cavity in the direction substantially parallel to the top wall and the bottom wall of the first middle plate region mold cavity, and does not need to overcome a height difference or need to turn. Therefore, there is a small flow rate loss and a stable flow state. In this way, even if the casting liquid flows into the position far away from the runner, a relatively high flow rate and a stable flow state can be maintained, to implement good filling quality, so that the formed middle frame has few sand holes, good quality, and high strength. In addition, in the solutions, even if the first middle plate region 10a has a smaller thickness, the filling quality can be ensured. Therefore, the first middle plate region 10a is allowed to be thinner, to facilitate a lightweight product design and provide larger accommodation space for the battery. In an implementation, the thickness (H2 in the figure) of the first middle plate region 10a is 0.3 mm.

Specifically, a top-side edge of the drainage material section A may be located above the surface on which the top surface of the first middle plate region 10a is located, below the surface on which the top surface of the first middle plate region 10a is located, or coplanar with the surface on which the top surface of the first middle plate region 10a is located. A bottom-side edge of the drainage material section A may be located above the surface on which the bottom surface of the first middle plate region 10a is located, below the surface on which the bottom surface of the first middle plate region 10a is located, or coplanar with the surface on which the bottom surface of the first middle plate region 10a is located. In a preferred implementation, the top-side edge of the drainage material section A is coplanar with the surface on which the top surface of the first middle plate region 10a is located, and the bottom-side edge of the drainage material section A is coplanar with the surface on which the bottom surface of the first middle plate region 10a is located. In this design, a relatively large part of the outlet of the runner in the die casting mold is directly opposite to the first middle plate region mold cavity, to greatly reduce a speed loss of the casting liquid.

Specifically, a distance between the top-side edge and the bottom-side edge of the drainage material section A is basically the same as a thickness (H1 in the figure) of the drainage material 01. To facilitate peeling-off of the drainage material 01, the drainage material 01 should not have an excessively large thickness, and a thickness approximating to 0.5 mm is appropriate. Correspondingly, the distance between the top-side edge and the bottom-side edge of the drainage material section A also approximates to 0.5 mm.

Figure 3:
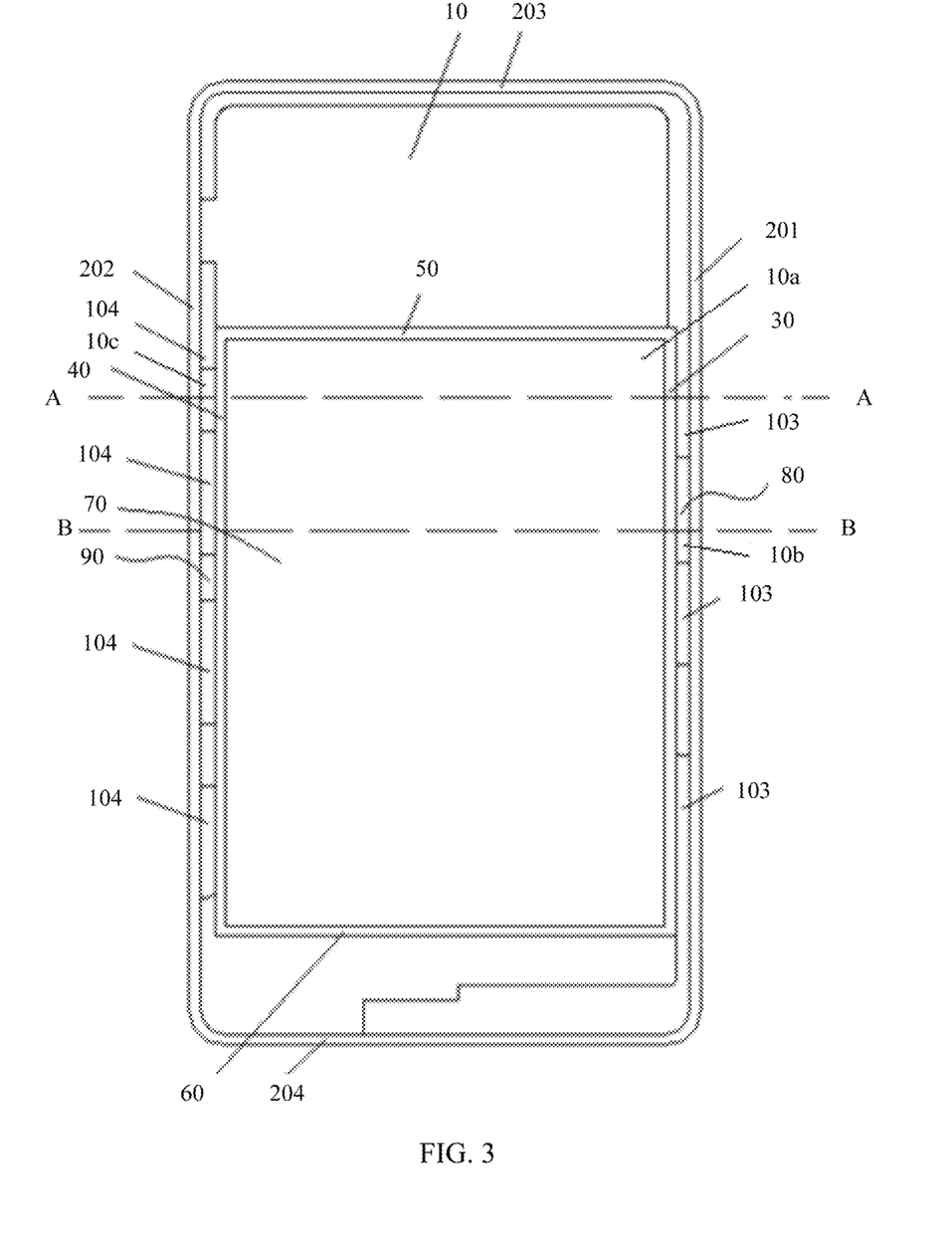
FIG. 3 is a top-side view of FIG. 1.
Figure 5:
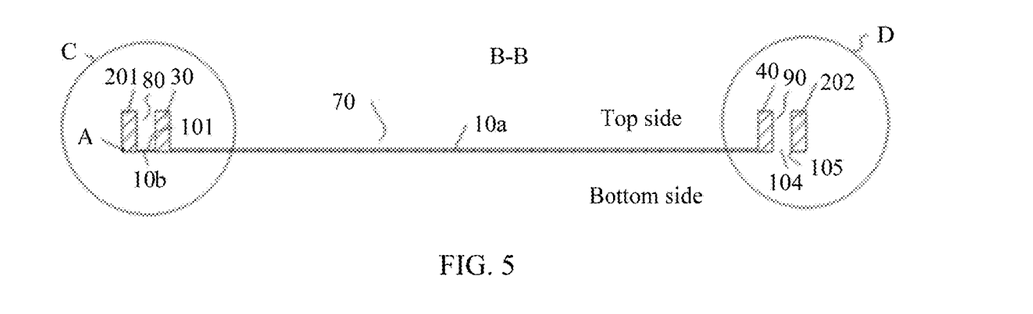
FIG. 5 is a sectional view of FIG. 3 along B-B.

As shown in FIG. 3 and FIG. 5, in this embodiment, the middle frame further includes a second accommodation chamber 80, the second middle plate 10 includes a second middle plate region 10b, and the second middle plate region 10b forms a bottom wall of the second accommodation chamber 80. The second middle plate region 10b is closer to the drainage material section A than the first middle plate region 10a. There is a first machined surface 101 on a surface of the second middle plate region 10b. The first machined surface 101 may be located on a top surface of the second middle plate region 10b or a bottom surface of the second middle plate region 10b. Alternatively, there is the first machined surface 101 on each of a top surface and a bottom surface of the second middle plate region 10b.

As shown in FIG. 6, that there is the first machined surface 101 on a top surface and/or a bottom surface of the second middle plate region 10b means that a thickness of a second middle plate region mold cavity in the corresponding die casting mold needs to be designed to be greater than a thickness of the second middle plate region of the target middle frame product. In this way, a thickness (H4) of a second middle plate region preform formed through die casting is greater than the thickness (H3) of the second middle plate region of the target middle frame product, and a top surface and/or a bottom surface of the second middle plate region preform are/is machined to remove an unnecessary thickness, to form the first machined surface 101 on the top surface and/or the bottom surface of the second middle plate region of the middle frame product. In an implementation, H4 is two times H3, H4 is 0.8 mm, and H3 is 0.4 mm.

Briefly, that there is the first machined surface 101 on a top surface and/or a bottom surface of the second middle plate region 10*b* means that the second middle plate region mold cavity in the corresponding die casting mold is thickened. The second middle plate region 10*b* is closer to the drainage material section A than the first middle plate region 10*a*, and therefore the second middle plate region mold cavity in the corresponding die casting mold is closer to the outlet of the runner than the first middle plate region mold cavity. During casting, the casting liquid first flows through the second middle plate region mold cavity, and then flows through the first middle plate region mold cavity. Therefore, whether the casting liquid flows smoothly in the second middle plate region mold cavity greatly affects filling quality of a subsequent mold cavity (especially the first middle plate region mold cavity with a small thickness and a large area). The second middle plate region mold cavity is thickened, so that smoothness of flow of the casting liquid in the second middle plate region mold cavity and the subsequent mold cavity is effectively improved. Therefore, the filling quality can be further improved, to reduce sand holes on the middle frame and improve the quality and strength of the middle frame.

As shown in FIG. 3 and FIG. 4, in this embodiment, a first through hole 103 is disposed in the second middle plate region 10*b*, and may be used as a lightening hole or a via hole through which an electrical connector of the electronic device passes. There is a second machined surface 102 on a wall surface of the first through hole 103. This means that the first through hole 103 is not formed in a die casting process, but is formed by performing machining on the second middle plate region preform formed through die casting. Therefore, no cylinder for forming a through hole is disposed in the second middle plate region mold cavity in the corresponding die casting mold, and there is no problem that there is high flow resistance for the casting liquid because the cylinder blocks flow of the casting liquid. In this way, the speed loss of the casting liquid can be further reduced, to reduce sand holes on the middle frame and improve the quality and strength of the middle frame.

Figure 7:
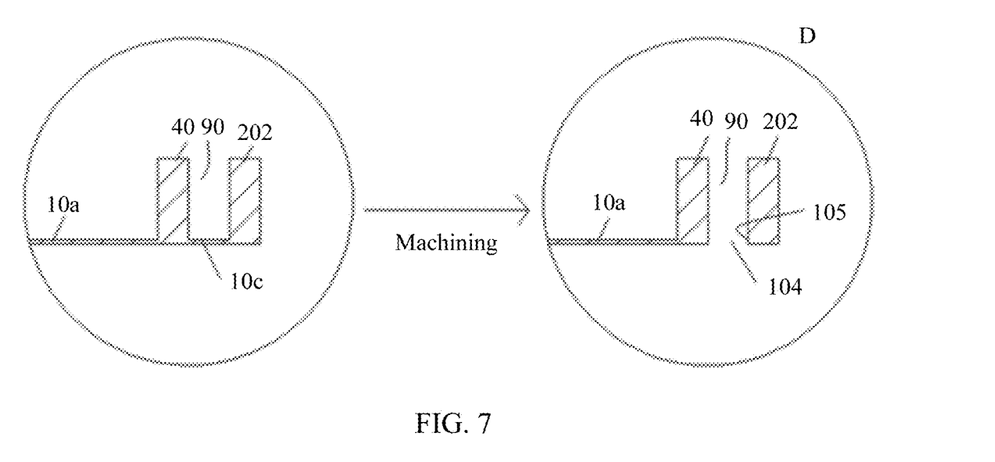
FIG. 7 shows a machining process of a third middle plate region, where parts presented in the figure correspond to parts in a circle D in FIG. 5, a left figure shows a middle frame preform formed through die casting, and a right figure shows a middle frame product.

As shown in FIG. 3 and FIG. 4, in this embodiment, the middle frame further includes a third accommodation chamber 90, the middle plate 10 includes a third middle plate region 10*c*, the third middle plate region 10*c* forms a bottom wall of the third accommodation chamber 90, and a second through hole 104 is disposed in the third middle plate region 10*c*, and may be used as a lightening hole or a via hole through which the electrical connector of the electronic device passes. As shown in FIG. 7, there is a third machined surface 105 on a wall surface of the second through hole 104. This means that the second through hole 104 is not formed in the die casting process, but is formed by performing machining on a third middle plate region preform formed through die casting. Therefore, no cylinder for forming a through hole is disposed in a third middle plate region mold cavity in the corresponding die casting mold, and there is no problem that there is high flow resistance for the casting liquid because the cylinder blocks flow of the casting liquid. In this way, the speed loss of the casting liquid can be further reduced, to reduce sand holes on the middle frame and improve the quality and strength of the middle frame.

Each machined surface may be a blanking surface or a cutting surface, in other words, a corresponding region of the middle frame preform formed through die casting may be machined by using a blanking device or a cutting device, to obtain the machined surface. Machining accuracy should be ensured regardless of in a blanking manner or a cutting manner, to avoid stress concentration at a machining position. A color, roughness, flatness, and/or the like of the machined surface are/is different from those/that of a region on the surface of the middle frame, and may be observed and identified visually or by using a dedicated detection device.

As shown in FIG. 1 to FIG. 3, in this embodiment, the middle frame further includes a frame 20 disposed around an outer side of the middle plate 10. The frame 20 includes a first frame edge 201 and a second frame edge 202 separated from each other and a third frame edge 203 and a fourth frame edge 204 separated from each other. A length of each of the first frame edge 201 and the second frame edge 202 is greater than a length of each of the third frame edge 203 and the fourth frame edge 204. In another embodiment, a length of each of the first frame edge 201 and the second frame edge 202 may be less than or equal to a length of each of the third frame edge 203 and the fourth frame edge 204. The four frame edges are sequentially head-to-tail connected to form the frame 20 in a shape similar to a rectangle. An arc-shaped transition part 205 is used for a smooth transition at connection positions of the four frame edges. Certainly, the shape of the frame 20 is not limited to a rectangle, and a quantity of frame edges is not limited to 4, and may be flexibly adjusted based on a product requirement.

As shown in FIG. 2, in this embodiment, the drainage material section A is located on an outer side surface of the first frame edge 201 with a relatively long length, and is equal to the first frame edge 201 in length. In this way, after flowing out of the outlet of the runner, the casting liquid can reach a position farthest away from the runner after flowing a relatively short distance, to further help ensure the filling quality. Certainly, in another embodiment, the drainage material section A may alternatively be located on an outer side surface of a frame edge with a relatively short length, or may be located on outer side surfaces of a plurality of frame edges.

As shown in FIG. 3, in this embodiment, the middle frame includes a first separation rib 30, a second separation rib 40, a third separation rib 50, and a fourth separation rib 60, and all of the four separation ribs are located in enclosed space of the frame 20. The first separation rib is close to the first frame edge 201, and is substantially parallel to the first frame edge 201. The second accommodation chamber 80 is located between the first separation rib 30 and the first frame edge 201. The first separation rib 30 and the first frame edge 201 form a sidewall of the second accommodation chamber 80. The second separation rib 40 is close to the second frame edge 202, and is substantially parallel to the second frame edge 202. The third accommodation chamber 90 is located between the second separation rib 40 and the second frame edge 202. The second separation rib 40 and the second frame edge 202 form a sidewall of the third accommodation chamber 90. The third separation rib 50 is connected between the first separation rib 30 and one end of the second separation rib 40. The fourth separation rib 60 is connected between the first separation rib 30 and the other end of the second separation rib 40. The first separation rib 30, the second separation rib 40, the third separation rib 50, and the fourth separation rib 60 form a sidewall of the first accommodation chamber 70. The first accommodation chamber and the second accommodation chamber 80 are separated by the first separation rib 30, and the first accommodation chamber 70 and the third accommodation chamber 90 are separated by the second separation rib 40. Certainly, an arrangement position of each accommodation chamber is not limited to that in this embodiment, and may be flexibly adjusted based on a product requirement.

In the design in which the drainage material section A is at least partially located between the surfaces on which the top surface and the bottom surface of the first middle plate region 10a are located, the speed loss of the casting liquid is reduced. Therefore, a separation rib and a frame edge on a side far away from the drainage material section A have relatively good forming quality.

In an embodiment, the second accommodation chamber 80 is configured to accommodate at least a part of a button of the electronic device. The button usually includes a pressing part exposed outside the middle frame and a linkage part linked with the pressing part, and the linkage part of the button may be accommodated in the second accommodation chamber 80. The third accommodation chamber 90 is configured to accommodate at least a part of an antenna of the electronic device. In another embodiment, the second accommodation chamber 80 is configured to accommodate at least a part of an antenna of the electronic device, and the third accommodation chamber 90 is configured to accommodate at least a part of a button of the electronic device. Certainly, no limitation is imposed by the two embodiments. Parts accommodated in the second accommodation chamber 80 and the third accommodation chamber may be flexibly adjusted based on different electronic devices.

Specifically, the middle frame may be made of an alloy material. Specifically, the middle frame may be made of an aluminum alloy, a magnesium alloy, or the like. Certainly, no limitation is imposed by the alloy material, and any material suitable for die casting may be used.

In addition, a middle frame assembly provided in this application includes the foregoing middle frame, and further includes a plastic part injection-molded on a surface of the middle frame. The plastic part covers the surface of the middle frame, and implements a cushioning function and a function of protecting the middle frame. In addition, different appearance effects may be achieved on the plastic part.

In addition, an electronic device provided in this application includes the foregoing middle frame. The electronic device may be a mobile phone or a tablet computer, or may be a terminal product that includes a screen, for example, a handheld computer, a walkie-talkie, a POS machine, an event data recorder, a wearable device, a virtual reality device, or a vehicle-mounted front loading apparatus. In an embodiment, a screen of the electronic device is mounted on a bottom side of the middle frame. Specifically, the screen may be bonded to a middle plate 10 of the middle frame by using structural adhesive, and a cover of the electronic device is mounted on a top side of the middle frame. Specifically, the cover may be provided with an outer surrounding part, and the outer surrounding part adaptively covers an outer side of a frame 20 of the middle frame.

In this specification, the principle and implementations of this application are described by using specific examples. The description of the foregoing embodiments is merely intended to help understand the method and the core idea of this application. It should be noted that a person of ordinary skill in the art can make some improvements and modifications to this application without departing from the principle of this application, and these improvements and modifications shall fall within the protection scope of the claims of this application.

What is claimed is:

1. A middle frame of an electronic device, wherein the middle frame comprises:
   a middle plate and a first accommodation chamber configured to accommodate a battery of the electronic device;
   a frame disposed around an outer side of the middle plate, the frame including a first frame edge with a first length, a second frame edge with a second length, and third frame edge with a third length, and a fourth frame edge with a fourth length, wherein the first and second lengths are longer than the third and fourth lengths; and
   a drainage material section on an outer side surface of the first frame edge and having a length at least half of the first length,
   wherein the middle plate comprises a first middle plate region forming a bottom wall of the first accommodation chamber, and the drainage material section is at least partially located between a top surface and a bottom surface of the first middle plate region, and the middle frame comprises a second accommodation chamber, the middle plate comprises a second middle plate region forming a bottom wall of the second accommodation chamber.

2. The middle frame of an electronic device according to claim 1, wherein a top-side edge of the drainage material section is coplanar with the top surface of the first middle plate region, and a bottom-side edge of the drainage material section is coplanar with the bottom surface of the first middle plate region.

3. The middle frame of an electronic device according to claim 1, wherein the second middle plate region is closer to the drainage material section than the first middle plate region, and the second middle plate region includes a first machined surface on a top and/or a bottom surface of the second middle plate region.

4. The middle frame of an electronic device according to claim 3, wherein a first through hole is disposed in the second middle plate region, and the first through hole includes a second machined surface on a wall surface of the first through hole.

5. The middle frame of an electronic device according to claim 3, wherein the middle frame comprises a third accommodation chamber, the middle plate comprises a third middle plate region forming a bottom wall of the third accommodation chamber, a second through hole is disposed in the third middle plate region, and the second through hole includes a third machined surface on a wall surface of the second through hole.

6. The middle frame of an electronic device according to claim 4, wherein the middle frame comprises a third accommodation chamber, the middle plate comprises a third middle plate region forming a bottom wall of the third accommodation chamber, a second through hole is disposed in the third middle plate region, and the second through hole includes a third machined surface on a wall surface of the second through hole.

7. The middle frame of an electronic device according to claim 5, wherein one of the second accommodation chamber and the third accommodation chamber is configured to accommodate at least a part of an antenna of the electronic device, and the other accommodation chamber is configured to accommodate at least a part of a button of the electronic device.

8. The middle frame of an electronic device according to claim 6, wherein one of the second accommodation chamber and the third accommodation chamber is configured to accommodate at least a part of an antenna of the electronic device, and the other accommodation chamber is configured to accommodate at least a part of a button of the electronic device.

9. The middle frame of an electronic device according to claim 6, wherein the middle frame comprises a frame disposed around an outer side of the middle plate and a separation rib located in enclosed space of the frame, and a sidewall of each of the first accommodation chamber, the second accommodation chamber, and the third accommodation chamber is formed by the frame and/or the separation rib.

10. The middle frame of an electronic device according to claim 1, wherein the middle frame is made of an alloy material.

11. A middle frame assembly, comprising:
a middle frame; and
a plastic part injection-molded on a surface of the middle frame, wherein the middle frame comprises:
  a middle plate;
  a first accommodation chamber configured to accommodate a battery of an electronic device;
  a frame disposed around an outer side of the middle plate, the frame including a first frame edge with a first length, a second frame edge with a second length, and third frame edge with a third length, and a fourth frame edge with a fourth length, wherein the first and second lengths are longer than the third and fourth lengths; and
  a drainage material section disposed on an outer side surface of the first frame edge and having a length at least half of the first length, wherein the middle plate comprises a first middle plate region for-forming a bottom wall of the first accommodation chamber, and the drainage material section is at least partially located between a top surface and a bottom surface of the first middle plate region; and
  a second accommodation chamber, the middle plate comprises a second middle plate region forming a bottom wall of the second accommodation chamber.

12. An electronic device, comprising:
a middle frame, the middle frame comprising:
  a middle plate;
  a first accommodation chamber configured to accommodate a battery of an electronic device;
  a frame disposed around an outer side of the middle plate, the frame including a first frame edge with a first length, a second frame edge with a second length, and third frame edge with a third length, and a fourth frame edge with a fourth length, wherein the first and second lengths are longer than the third and fourth lengths;
  a drainage material section disposed on an outer side surface of the first frame edge and having a length equal to the first length, wherein the middle plate comprises a first middle plate region forming a bottom wall of the first accommodation chamber, and the drainage material section is at least partially located between a top surface and a bottom surface of the first middle plate region; and
  a second accommodation chamber, the middle plate comprises a second middle plate region for-forming a bottom wall of the second accommodation chamber.

13. The electronic device according to claim 12, wherein a top-side edge of the drainage material section is coplanar with the top surface of the first middle plate region, and a bottom-side edge of the drainage material section is coplanar with the bottom surface of the first middle plate region.

14. The electronic device according to claim 12, wherein the second middle plate region is closer to the drainage material section than the first middle plate region, and the second middle plate region includes a first machined surface on a top and/or a bottom surface of the second middle plate region.

15. The electronic device according to claim 14, wherein a first through hole is disposed in the second middle plate region, and the first through hole includes a second machined surface on a wall surface of the first through hole.

16. The electronic device according to claim 14, wherein the middle frame comprises a third accommodation chamber, the middle plate comprises a third middle plate region forming a bottom wall of the third accommodation chamber, a second through hole is disposed in the third middle plate region, and the second through hole includes a third machined surface on a wall surface of the second through hole.

17. The electronic device according to claim 15, wherein the middle frame comprises a third accommodation chamber, the middle plate comprises a third middle plate region forming a bottom wall of the third accommodation chamber, a second through hole is disposed in the third middle plate region, and the second through hole includes a third machined surface on a wall surface of the second through hole.

18. The electronic device according to claim 16, wherein one of the second accommodation chamber and the third accommodation chamber is configured to accommodate at least a part of an antenna of the electronic device, and the other accommodation chamber is configured to accommodate at least a part of a button of the electronic device.

19. The electronic device according to claim 17, wherein one of the second accommodation chamber and the third accommodation chamber is configured to accommodate at least a part of an antenna of the electronic device, and the other accommodation chamber is configured to accommodate at least a part of a button of the electronic device.

20. The electronic device according to claim 17, wherein the middle frame comprises a frame disposed around an outer side of the middle plate and a separation rib located in enclosed space of the frame, and a sidewall of each of the first accommodation chamber, the second accommodation chamber, and the third accommodation chamber is formed by the frame and/or the separation rib.

* * * * *